(12) United States Patent
Kaperst

(10) Patent No.: US 8,950,668 B2
(45) Date of Patent: Feb. 10, 2015

(54) UNITARY MEMBERSHIP CARD

(71) Applicant: Michael Kaperst, Washington, DC (US)

(72) Inventor: Michael Kaperst, Washington, DC (US)

(73) Assignee: KL5 LLC, Lanham, MD (US)

( * ) Notice: Subject to any disclaimer, the term of this patent is extended or adjusted under 35 U.S.C. 154(b) by 0 days.

(21) Appl. No.: 13/972,080

(22) Filed: Aug. 21, 2013

(65) Prior Publication Data

US 2013/0334306 A1 Dec. 19, 2013

Related U.S. Application Data

(63) Continuation-in-part of application No. 13/623,918, filed on Sep. 21, 2012, now Pat. No. 8,540,148, which is a continuation of application No. 12/292,396, filed on Nov. 18, 2008, now abandoned.

(51) Int. Cl.
*G06K 5/00* (2006.01)
*G06K 19/14* (2006.01)
*G06Q 20/34* (2012.01)
*G07F 17/00* (2006.01)

(52) U.S. Cl.
CPC .......... *G06K 19/145* (2013.01); *G06Q 20/3572* (2013.01); *G06Q 20/3574* (2013.01); *G07F 17/0014* (2013.01)
USPC ....................................... 235/380

(58) Field of Classification Search
CPC .......... G06Q 20/3572; G06Q 20/3574; G07F 17/0014
USPC ..................... 235/379, 380, 382, 462.01, 487
See application file for complete search history.

(56) References Cited

U.S. PATENT DOCUMENTS

| | | |
|---|---|---|
| 5,770,843 A | 6/1998 | Rose et al. |
| 6,494,367 B1 | 12/2002 | Zacharias |
| 6,742,704 B2 | 6/2004 | Fitzmaurice et al. |
| 8,002,197 B1 * | 8/2011 | Whitaker ...................... 235/493 |
| 2006/0081702 A1 | 4/2006 | Nandakumar |
| 2007/0007348 A1 | 1/2007 | Shah |

OTHER PUBLICATIONS

International Search Report issued in PCT Application No. PCT/US2009/006163 dated as mailed Dec. 24, 2009.

* cited by examiner

*Primary Examiner* — Seung Lee
(74) *Attorney, Agent, or Firm* — Cozen O'Connor

(57) ABSTRACT

A unitary membership card capable of managing multiple membership accounts.

19 Claims, No Drawings

UNITARY MEMBERSHIP CARD

The present application is a continuation-in-part of application Ser. No. 13/623,918, filed Sep. 21, 2012, which is a continuation of application Ser. No. 12/292,396, filed Nov. 18, 2011, which is incorporated herein by reference in its entirety.

FIELD OF THE INVENTION

The present invention relates to devices, methods and systems for managing multiple membership accounts a single, unitary membership card.

BACKGROUND OF THE INVENTION

Membership cards, such as health club cards, video rental cards, library cards, promotional cards, discount cards, and loyalty cards (e.g., frequent flyer cards, grocery discount cards, and the like) are widely used. The proliferation of such membership cards has escalated to the point where over 60% of the population in Europe possesses two or more loyalty cards, and nearly 80% of all grocery transactions in the U.S. take place with a membership card.

Membership cards may include a variety of different indicia to identify the card, the individual using the card, a membership account, an expiration date, and other information. The indicia may include a string of alphanumeric characters, a barcode, or an encoded magnetic strip attached to the card. In the case where barcodes are used as the indicia, an organization typically creates a membership card that includes only one such barcode.

Vendors that wish to track member activity typically want to ensure that each user of an account receive a membership card that is appropriately associated with the membership account. Unfortunately, these cards have taken over the space in people's wallets and purses.

Vendors have also issued smaller versions of their loyalty cards that are designed to be attached to a keychain. These devices contain only the basic indicia representing the membership identifier, such as a single barcode containing the owner's membership number. This has resulted in cumbersome key chains that burden the consumer just as much as the cards. The typical consumer now carries several cards in his wallet and a plethora of key chain tokens.

Furthermore, while consumers are being bombarded with new card offers daily, they still have to carry credit cards, driver's licenses, and often choose to carry pictures of their loved ones as well.

In an attempt to reduce the number of such cards carried by an individual, bar code numbers have been provided to a card provider that prints several bar codes on one card. See, e.g., U.S. Patent Application Publication No. US 2007/0007348; www.one-der-card.com: wvvw.justoneclubcard.com. These devices, however, are limited by the number of different membership accounts that can be incorporated without the card becoming too large.

There remains, therefore, a need for a single, unitary membership card that can replace a plurality of pre-existing membership accounts.

SUMMARY OF THE INVENTION

It is therefore an object of the present invention to provide devices, methods and systems by which all of the information required to interact with pre-existing membership accounts may be unified into one easy to carry accessory. It is further an object of this invention to provide a single device that may replace several memberships cards and/or key tags, and may be designed to operate with magnetic stripe readers and/or barcode readers from several different organizations chat do not have a partnership or pre-existing relationship.

It is also an object of this invention to provide devices, method and systems by which card users may avoid having to carry multiple membership cards and/or key tags by consolidating the relevant information in a single account, which is accessed using a single device.

In accordance with these and other objects, a first embodiment of the present invention is directed to unitary membership card comprising: (i) a substrate; and (ii) means for storing an identifier corresponding to a plurality of membership data items. According to this embodiment, each of the plurality of membership data items corresponds to an independent membership account associated with a user. That is, the single identifier stored on the unitary membership card, such as a telephone number, is used to represent a plurality of different membership accounts, each of which has a particular membership number associated with it.

A further embodiment includes a unitary membership card comprising: (i) an electronic substrate; (ii) a bar code means for storing an alphanumeric identifier corresponding to a telephone number of a user; and (iii) wherein said alphanumeric identifier corresponding to a plurality of membership data items, each of said plurality of membership data items corresponding to a membership account associated with a user.

A further embodiment is a unitary membership card comprising: (i) a substrate; (ii) a bar code means for storing an alphanumeric identifier corresponding to a telephone number of a user; (iii) a database; (iv) purchase date; and (iv) wherein said alphanumeric identifier corresponding to a plurality of membership data items, each of said plurality of membership data items corresponding to a membership account associated with a user and wherein said purchase data corresponds to items purchased in connection with the unitary membership card are stored in said database.

A further embodiment is a unitary membership card comprising: (i) a first unitary membership card; (ii) an electronic substrate; (iii) a bar code means for storing an alphanumeric identifier corresponding to a telephone number of a user; (iv) a second unitary membership card; and (v) wherein said alphanumeric identifier corresponding to a plurality of membership data items, each of said plurality of membership data items corresponding to a membership account associated with a user; and wherein said first and second unitary membership cards are related; and wherein said first unitary membership card is a primary card and said second unitary membership card.

A further embodiment is a method of joining a membership club comprising the steps of: (1) inputting personal information onto a unitary membership card comprising a substrate and means for storing an identifier corresponding to a plurality of membership data items; (2) utilizing said unitary membership card with a merchant that utilizes a membership card system and; (3) uploading personal information from said unitary membership card to said merchant thereby joining said merchants membership card system.

A further embodiment is a method of receiving a receipt from a merchant comprising presenting a unitary membership card comprising a substrate and means for storing an identifier corresponding to a plurality of membership data items and at least an email address corresponding to a user; (2) accessing information from said membership card; (3)

and said merchant providing an electronic receipt via said email address associated with said membership card.

It is to be understood that both the foregoing general description and the following detailed description are exemplary and explanatory only and are intended to provide further explanation of the invention as claimed.

DETAILED DESCRIPTION OF PREFERRED EMBODIMENTS

A first preferred embodiment of the present invention is directed to unitary membership card comprising; (i) a substrate; and (ii) means for storing an identifier corresponding to a plurality of membership data items. According to this embodiment, each of the plurality of membership data items corresponds to an independent membership account associated with a user. That is, a single identifier stored on the unitary membership card, such as a telephone number, is used to represent a plurality of different membership accounts, each of which has a particular membership number associated with it.

The substrate may be in any suitable form or shape for a membership card, and the present invention is not limited to any particular form or shape. Thus, according to certain particularly preferred embodiments, the substrate may take the shape of a rectangular card or square card. According to other preferred embodiments, the substrate may take the shape of a key tag (e.g. for use with a key chain).

In other embodiments, the substrate is an electronic medium, such as a mobile telephone or other commonly carried electronic device capable of displaying the means for storing an identifier corresponding to a plurality of membership data items. Indeed, it is particularly suited that a smart phone or similar device be utilized, as the device may also comprise an application that can help a user track their purchases on using the unitary membership card. For example, an application can track all items purchased at a grocery store. The ability to track and store data of purchase items and habits can then be utilized by consumers and retail stores to provide for suggested goods, or find better prices for items, as but a few examples.

Indeed, the use of an application on a smart phone, either alone, or in combination with a database, may provide for the ability to store, track, and mine purchase data by consumers and retail stores. The purchase data can be utilized by retail stores to target advertisements to consumers based on their spending habits, or can be utilized by consumers, for example, to be notified when products frequently purchased are on sale. The system can then utilize the purchase data to recognize items purchased by the consumer, and create a shopping list in a database or in an application corresponding to said items. In turn, coupons for similar or related goods may be targeted to the consumer, or the consumer notified when said items or goods are on sale or have coupons available.

Where said program creates a list of typical goods purchased, the application or other program then provides information regarding current pricing of goods. In this manner, a the program identifies common items for purchase and generates a shopping list containing said items and provides the consumer with the price that the goods would be expected to cost once checking out of the store. This provides valuable information for consumers seeking to keep a budget of their purchases. The consumer can then edit the shopping list to include additional items or remove items that are unnecessary and keep a tallied budget before shopping.

The power of the purchase data allows both consumers and merchants to benefit from organizing and recognizing the consumer's spending habits. Consumers can then further benefit by comparing prices with various venders by utilizing said purchase data with a program that mines current prices for said items with competing merchants. Similarly, programs intended to find and utilize coupons or rebates can be applied within the program to benefit consumers. Merchants and business can benefit by sending competing products or improving pricing to win the consumers business.

The inventive unitary membership card includes means for storing an identifier corresponding to a plurality of membership data items. Preferred means for storing include, but are not limited to, the following: bar codes; magnetic strips; smart chips; RFIDs; and combinations of two or more thereof.

According to certain particularly preferred embodiments of the present invention, the identifier corresponding to a plurality of membership data items is a unique alphanumeric string. More preferably, the unique alphanumeric string corresponds to a telephone number uniquely associated with the user. According to such embodiments of the present invention, the use of a telephone number as the identifier omits the need for a central database of membership accounts. This is because most merchants, or other card accepters, generally associate membership numbers with a user's telephone number(s) in their own databases (and can therefore access the appropriate membership information by entering the identifier stored on the unitary membership card). Such embodiments of the present invention are particularly useful in applications where the means for storing the identifier is a magnetic strip or barcode.

As an alternative, a unitary membership card may have a plurality of sub-membership accounts associated with a primary account. For example, a family has four cards, card A being the primary card, and cards B, C, and D being subsidiary cards. Each card would utilize a different alphanumeric number that would correspond to each of the different cards. However, data, based on use of each of the cards would all be stored in connection with the primary card, A. This would allow tracking of different users, but provide membership data items being accessible to all four users. This is particularly helpful when a family uses a single membership card at a grocery store, to accrue points; or where a family membership is purchased to a business establishment. A primary and secondary card relationship may include two cards, three cards, four cards, or five or more cards as appropriate for a particular family or group that would benefit from a primary and secondary card system.

The primary card allows memberships associated with the primary card holder to aver the benefits to the secondary cards and secondary holders. For example, "family" memberships, paid to merchant, will allow secondary cards to benefit from the purchase of the membership to a primary card. Also, systems where "points" are earned based on spending at a merchant can be combined, so that points earned via secondary cards are associated with the primary card account.

However, as each card is unique, the data may also be split out to the individual users and tracking each users particular habits, while still provide for the group or family unification of membership cards.

In a further embodiment, the group or family membership cards could have the same primary alphanumeric number, but include at least one unique identifier for each of the cards, i.e. adding one or more additional alphanumeric identifier to the primary number.

In addition to the membership data items, the unitary membership card may also contain personal identification information relating to the user, such as the following: one or more telephone numbers; one or more mailing addresses; one or more residential and/or work addresses; one or more email addresses; a social security number; and the like.

According to certain preferred embodiment of the present invention, the user of multiple membership cards forwards at least one membership data item, such as a membership number, to a unitary membership card provider. This forwarding may be accomplished by any of a number of suitable methods, including forwarding individual membership cards directly to the unitary membership card provider or entering membership numbers using an internet website. The unitary membership card provider preferably incorporates the membership data item(s) into a database and generates a unique identifier corresponding to the user, such as the user's telephone number. The unitary membership card provider also generates a unitary membership card of the present invention and forwards it to the user. Upon receiving the unitary membership card, the user may present it at an independent entity's establishment for reading of the unique identifier and subsequent accessing of the associated membership data item(s).

As a user acquires new membership accounts, the user forwards at least one membership data item associated with each such account to the unitary membership card provider for inclusion in the database maintained by the unitary membership card provider.

The user may also forward one or more user preferences associated with one or more membership accounts (e.g. seat and meal preferences for a frequent flyer account, options/selection associated with a reward/loyalty program, etc.) and/or one or more user preferences associated with the unitary membership account.

Such preferences and other data items can be utilized to improve consumer experiences with regard to the use of products or services frequently used by consumers. This allows service industries or stores to cater to the particular needs of its consumers. In addition, such data is valuable as a marketing tool, and such data, with permission, may be utilized by a store or other third-parties to target a consumer based on the consumers purchasing habits.

A further embodiment of the invention allows a user to use an e-mail address associated with the unitary membership club and to facilitate the e-mailing of a receipt after a purchase. More merchants are moving to an electronic receipt system. However, these systems frequently require a consumer to speak their email address, or to type it into a merchant. This results in consumers stating their email address in public areas, which may force some consumers to unknowingly share their email address with strangers. Furthermore, there is the potential for errors in typing in the email address which results in the receipt not being received by the consumer. These issues are solved by providing the email address on the unitary membership card, accessing the email address and emailing the receipt via the email address provided on the unitary membership card. Alternatively, the receipt can be texted or sent via other electronic media.

Furthermore, the ability to receive an electronic receipt provides for additional date items that can be stored with a user's account with a unitary membership card. Accordingly, users can access receipts and thereby amounts spent at various merchants.

A further embodiment is a method of joining a membership club associated with a merchant by accessing the data on a unitary membership card. Accordingly, a user having a unitary membership card loads the user's personal information onto the unitary membership card, and then allows a merchant to access the data on the unitary membership card. If the user is not previously registered with said merchant's membership card/club, the personal information is loaded into the merchant's system via a server or other electronic medium, and the user is then registered with the merchant's membership club.

This facilitates both merchants and consumers in transferring information to join the membership club. This allows consumers the benefits of membership without the hassle of filling out a paper form and allows merchants to gain additional members into their programs, thereby creating additional advertising opportunities and consumers for their business.

The foregoing description and the following examples are illustrative only and are not intended to limit the scope of the invention as defined by the appended claims. It will be apparent to those skilled in the art that various modifications and variations can be made in the methods of the present invention without departing from the spirit and scope of the invention. Thus, it is intended that the present invention cover the modifications and variations of this invention provided they come within the scope of the appended claims and their equivalents.

What is claimed is:

1. A unitary membership card comprising: (i) a substrate; (ii) a bar code means for storing an alphanumeric identifier corresponding to a telephone number of a user; and (iii) a database; (iv) wherein said alphanumeric identifier corresponding to a plurality of membership data items, each of said plurality of membership data items corresponding to a membership account associated with a user; and (v) wherein said database stores purchase data corresponding to items purchased in connection with the unitary membership card.

2. The unitary membership card of claim 1 wherein said substrate is an electronic substrate.

3. The unitary membership card of claim 2 wherein said electronic substrate is a mobile telephone or a smart phone.

4. The unitary membership card of claim 2 wherein said electronic substrate further comprises an application capable of tracking and managing said purchase data.

5. The unitary membership card of claim 4 wherein said data further comprises a list of frequently purchased goods, and wherein said list of frequently purchased goods is populated on said application.

6. The unitary membership card of claim 5 wherein said list of frequently purchased goods includes data regarding current prices for each of said frequently purchased goods.

7. The unitary membership card of claim 6 wherein said list of frequently purchased goods includes a summary of total cost of all goods.

8. The unitary membership card of claim 1 wherein said membership account comprises an email address for said user and wherein use of said unitary membership card provides said email address for electronically receiving a receipt from a purchase.

9. A unitary membership card comprising: (i) a first unitary membership card; (ii) an electronic substrate; (iii) a bar code means for storing an alphanumeric identifier corresponding to a telephone number of a user; (iv) a second unitary membership card; and (v) wherein said alphanumeric identifier corresponding to a plurality of membership data items, each of said plurality of membership data items corresponding to a membership account associated with a user; and wherein said first and second unitary membership cards are related; and wherein said first unitary membership card is a primary card and said second unitary membership card is a secondary card.

10. The unitary membership card of claim 9 comprising three or more unitary membership cards, wherein said first unitary membership card is a primary card and said additional unitary membership cards are secondary cards.

11. The unitary membership card of claim 10, further comprising a database and purchase data; wherein said purchase data, using either any of three or more unitary membership cards is stored in a database that combines the data from the three or more unitary membership cards.

12. The unitary membership card of claim 9, further comprising a database and purchase data; wherein said purchase data, using either said first or second unitary membership card is stored in a database that combines the data from the first or second unitary membership card.

13. The unitary membership card of claim 12 wherein said electronic substrate further comprises an application capable of tracking and managing said purchase data.

14. The unitary membership card of claim 13 wherein a list of frequently purchased goods is populated on said application.

15. The unitary membership card of claim 14 wherein said list of frequently purchased goods includes data regarding current prices for each of said frequently purchased goods.

16. The unitary membership card of claim 15 wherein said list of frequently purchased goods includes a summary of total cost of all goods.

17. The unitary membership card of claim 9 wherein said primary card and said secondary card have the same alphanumeric identifier.

18. The unitary membership card of claim 9 wherein said primary card and said secondary card have a different alphanumeric identifier.

19. A method of using a unitary membership card to join a membership club of a merchant comprising:
 a. loading personal information of a user onto a unitary membership card comprising (i) a substrate; (ii) a bar code means for storing an alphanumeric identifier corresponding to a telephone number of a user; and (iii) a database; (iv) wherein said alphanumeric identifier corresponding to a plurality of membership data items, each of said plurality of membership data items corresponding to a membership account associated with a user; and (v) wherein said database stores purchase data corresponding to items purchased in connection with the unitary membership card;
 b. accessing said personal information at a merchant where the said personal information was not previously associated with a membership club at the merchant; and
 c. updating said personal information to a server with the merchant thereby joining said membership club with said merchant.

* * * * *